Figure 1:
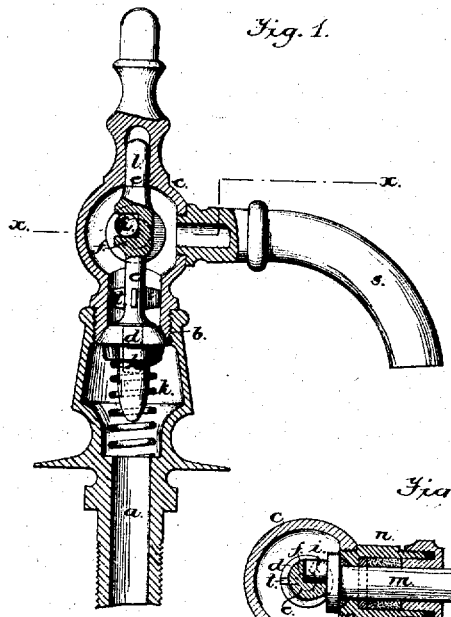

H. C. MEYER.

SELF-CLOSING FAUCET.

No. 7,694. Reissued May 22, 1877.

Witnesses;

Geo. L. Graham.

Jacob Fellus

Inventor;

Henry C. Meyer by J. N. McIntire

Attorney.

UNITED STATES PATENT OFFICE.

HENRY C. MEYER, OF NEW YORK, N. Y.

MPROVEMENT IN SELF-CLOSING FAUCETS.

Specification forming part of Letters Patent No. 179, 717, dated July 11, 1876; reissue No. 7,694, dated May 22, 1877; application filed February 28, 1877.

*To all whom it may concern:*

Be it known that I, HENRY C. MEYER, of the city, county, and State of New York, have invented certain new and useful Improvements in Self-Closing Faucets, of which the following is a full, clear, and exact description, reference being had to the accompanying drawings, forming part of this specification.

Previous to my invention faucets have been made in a great variety of ways, and both self-closing and so that they required to be closed by hand, in all of which, however, the valve either closes with or against the pressure of the supply-column of water.

In faucets in which the valve is seated against the water-pressure exit, to a greater or less extent, objections due to this principle of operation, while in that kind of faucets in which the valve closes with the pressure, and is forced and held toward its seat by the pressure of the supply-column, are involved certain objections due to this principle of operation.

I have found by practical observation and experience that a faucet made substantially in accordance with Letters Patent No. 167,092, granted to A. Fuller, and known to the trade as the "Fuller faucet," in which is employed an elastic rubber valve, closing against its seat in the direction of the flow of water, and having its stem actuated by a crank-pin on the end of a spindle or shaft passing through a stuffing-box, and provided at its exterior end with a suitable handle, involves, in an eminent degree, the elements of perfection of operation and durability; and I propose to avail myself of the desirable features of construction and principles of operation involved in the Fuller faucet in the production of a self-closing faucet.

In order to produce a self-closing faucet involving the desirable features of construction peculiar to the Fuller faucet, I have had to devise means, first, to avoid the possibility of a placement of the valve-stem, in the operation of opening the cock by the action of the crank-pin, in such a position that the closing-spring might not effect the enforcement of the valve automatically to its seat; second, to insure a perfectly rectilinear movement of the valve-stem, in order that the valve may always come to its seat with a smooth and positive movement, and thus not permit any vibration laterally, and the noise and jar consequent to such vibration of the valve.

To these ends and objects my invention consists, first, in a novel combination or arrangement of the crank-pin with the valve-stem, whereby, while the former can move to a sufficient extent to properly actuate the latter, it cannot possibly get on a dead-center, and thereby obstruct the operation of or incapacitate the closing-spring; second, in the combination, with the valve-stem and the valve-closing spring, of means to insure a rectilinear movement of the stem and its valve, and thus prevent any lateral movement or vibration during the sudden closing of the valve under a heavy pressure, all as will be hereinafter more fully described.

To enable those skilled in the art to make and use my improved faucet, I will now more particularly explain its construction and operation, referring by letters to the accompanying drawings, in which—

Figure 2:
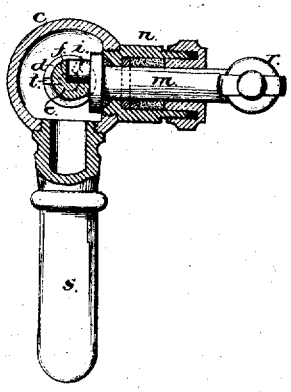

Figure 1 is a vertical section of the faucet complete, and Fig. 2 is a sectional view at the line *x x* of Fig. 1.

In the several figures the same part will be found designated by the same letter of reference.

*a* is the supply-pipe, which is connected, as usual, by a screw-thread at *b*, to the shell or body *c* of the faucet, at the lower end of which latter is formed the seat for the valve *d*, as most clearly seen at Fig. 1.

The valve *d* is made of india-rubber, and is mounted on the stem *e*, as shown, against the shoulder, near the lower end of which it is clamped and held by the nut *h*, the tapering or teat-like portion of the said nut forming, as clearly illustrated, a steady-pin for the upper portion of a spiral spring, *k*, the lower end of which rests on an interior shoulder of the supply-pipe, and which spring serves the purpose of closing the valve *d* upward against its seat.

The stem *e* is guided at its upper end *l* by a cavity or housing formed for its accommodation in the upper portion of the cock-body *c*, and the said stem *e* is also guided or retained in a central position within the water-way, at its lower portion, by means of wings *t* upon it, which move with the stem up and down within the lower cylindrical portion of the body *c*.

At *f* is an enlargement of the stem *e*, in which is formed a cavity for the reception of the crank-pin *i*, that projects from the inner end of the spindle or arbor *m*, and works in said cavity, as will be presently more fully explained.

The spindle *m* passes through a stuffing-box, *n*, and is provided at its exterior end with a handle, *r*, all substantially as in the well-known "Fuller faucets" heretofore used. *s* is the usual bib or discharge nozzle, arranged at one side of the body *c* of the faucet.

The cavity in the enlarged portion *f* of the valve-stem, and in which the crank-pin *i* works, is made of such depth transversely of the stem *e* that, while the crank-pin *i* may be turned sufficiently far in either direction to permit all the necessary movement of the valve from and toward its seat, the said crank-pin cannot possibly be turned far enough in either direction to get on a dead-center, and hence the valve cannot be blocked open against the closing tendency and action of the valve-spring *k*.

The spring *k*, it will be understood, is of sufficient strength to overcome the friction of the parts and effect the enforcement of the valve *d* to its seat with certainty.

From the foregoing description and the drawings it will be understood that the operation of my improved self-closing faucets is as follows: When it is desired to open the cock the handle *r* of the spindle *m* is simply turned sufficiently far in the proper direction to cause the crank-pin *i* to move downward in its circular path of motion, and by pressure upon the lower surface of the cavity in enlargment *f* to force the stem *e* and its valve *d* downward, compressing the spring *k*, and thus permit the free passage of the water upward around the valve and stem into the body *c*, and thence out at the nozzle *s* of the faucet; and when it is desired to stop the flow of water the opening-handle is released, whereupon the spring *k* forces the valve *d* upward toward and against its seat, thus cutting off the escape of the water past the valve, and returning all the working parts to, and retaining them in, their former and normal positions.

Where the head or pressure of water is sufficiently great, the enforcement of the valve *d* toward its seat, and its retention thereon is of course facilitated by the pressure, and the latter acts as an auxiliary to the spring.

It will be understood that, by combining the actuating crank-pin *i*, or its equivalent, in the manner described, with a valve-stem guided laterally, the possibility of the actuating-pin *i* getting on a dead-center, to either block or impair the automatic closing of the valve by the closing-spring, is effectually avoided, and it will be seen that, by the combination, with the valve-stem and its adjuncts, of means, as shown and described, for guiding the stem, or holding it in a central position, during its up and down movements in the water-way, not only is an crowding over sidewise of the stem and valve by the movements of the crank-pin prevented, but the said stem and valve are always held centrally against any tendency to lateral displacement, and the easy and certain seating of the valve insured where the pressure is great, and all rattle and noise avoided under all circumstances.

I am aware that the precise detailed construction of parts is not material to my invention, and that, so long as substantially the same means are combined in substantially the manner and for the purposes shown and described, my improvements may be involved in the construction of a faucet embodying all the main advantages of my invention.

What I therefore claim as new, and desire to secure by Letters Patent, is—

1. In a self-closing faucet, the combination, with the valve-stem, of an actuating crank-pin, the construction and arrangement of these parts being such that the throw of the crank-pin is limited by the valve-stem, for the purpose set forth.

2. In a faucet in which the valve closes with the pressure, the combination, with the valve-stem, of means, substantially as described, for guiding or holding the stem near each end, to insure a perfectly central movement of the valve in the water-way, as set forth.

In testimony whereof I have hereunto set my hand and seal this 27th day of February, 1877.

HENRY C. MEYER. [L. S.]

In presence of—

J. N. McINTIRE,

JACOB FELBEL.